United States Patent [19]
Abler

[11] Patent Number: 5,988,052
[45] Date of Patent: Nov. 23, 1999

[54] APPARATUS FOR MEASURING RATE OF CHEESE PRODUCTION

[75] Inventor: Joseph H. Abler, Brookfield, Wis.

[73] Assignee: Stainless Steel Fabricating, Inc., Columbus, Wis.

[21] Appl. No.: 09/083,840

[22] Filed: May 22, 1998

Related U.S. Application Data

[60] Provisional application No. 60/064,824, Nov. 7, 1997.

[51] Int. Cl.[6] .............................. A01J 25/00; A01J 25/11; A23C 19/00; A23L 1/00
[52] U.S. Cl. ................................ 99/494; 99/452; 99/459; 99/489; 118/13; 118/24; 222/630; 222/637
[58] Field of Search .............................. 99/452, 453–459, 99/460–466, 494, 486–489, 535; 118/13, 24, 308, 425, 696, 664; 222/630, 637, 55, 200; 426/582, 231, 519, 522, 478, 491, 495

[56] References Cited

U.S. PATENT DOCUMENTS

| | | | |
|---|---|---|---|
| 3,592,124 | 7/1971 | Pontecorvo et al. | 99/464 |
| 4,112,131 | 9/1978 | Bosy et al. | 426/582 |
| 4,244,286 | 1/1981 | Rust | 99/535 X |
| 4,254,698 | 3/1981 | Savarese | 99/460 |
| 4,332,831 | 6/1982 | Rust | 99/459 X |
| 4,741,460 | 5/1988 | Blain et al. | 222/55 |
| 4,820,540 | 4/1989 | Budahn | 99/452 |
| 4,936,489 | 6/1990 | Blain et al. | 99/494 |
| 5,195,426 | 3/1993 | Thuli | 99/452 |
| 5,704,280 | 1/1998 | Scherping et al. | 99/459 X |
| 5,738,772 | 4/1998 | Bartasis et al. | 118/24 X |
| 5,853,786 | 12/1998 | Anbarci et al. | 99/452 X |
| 5,855,671 | 1/1999 | Scherping et al. | 118/13 |

*Primary Examiner*—Timothy Simone
*Attorney, Agent, or Firm*—Quarles & Brady LLP

[57] ABSTRACT

An apparatus for producing cheese includes a dispenser for applying salt to the cheese at a rate which varies in response to a control signal. The cheese travels across a platform to which a first sensor is attached for measuring the weight of the cheese. A second sensor measures the linear amount of cheese traveling across the platform. A controller derives the rate of cheese production based on the weight and the linear amount of cheese. The controller utilizes the rate of cheese production to produce the control signal and thereby control application of salt to the cheese.

5 Claims, 2 Drawing Sheets

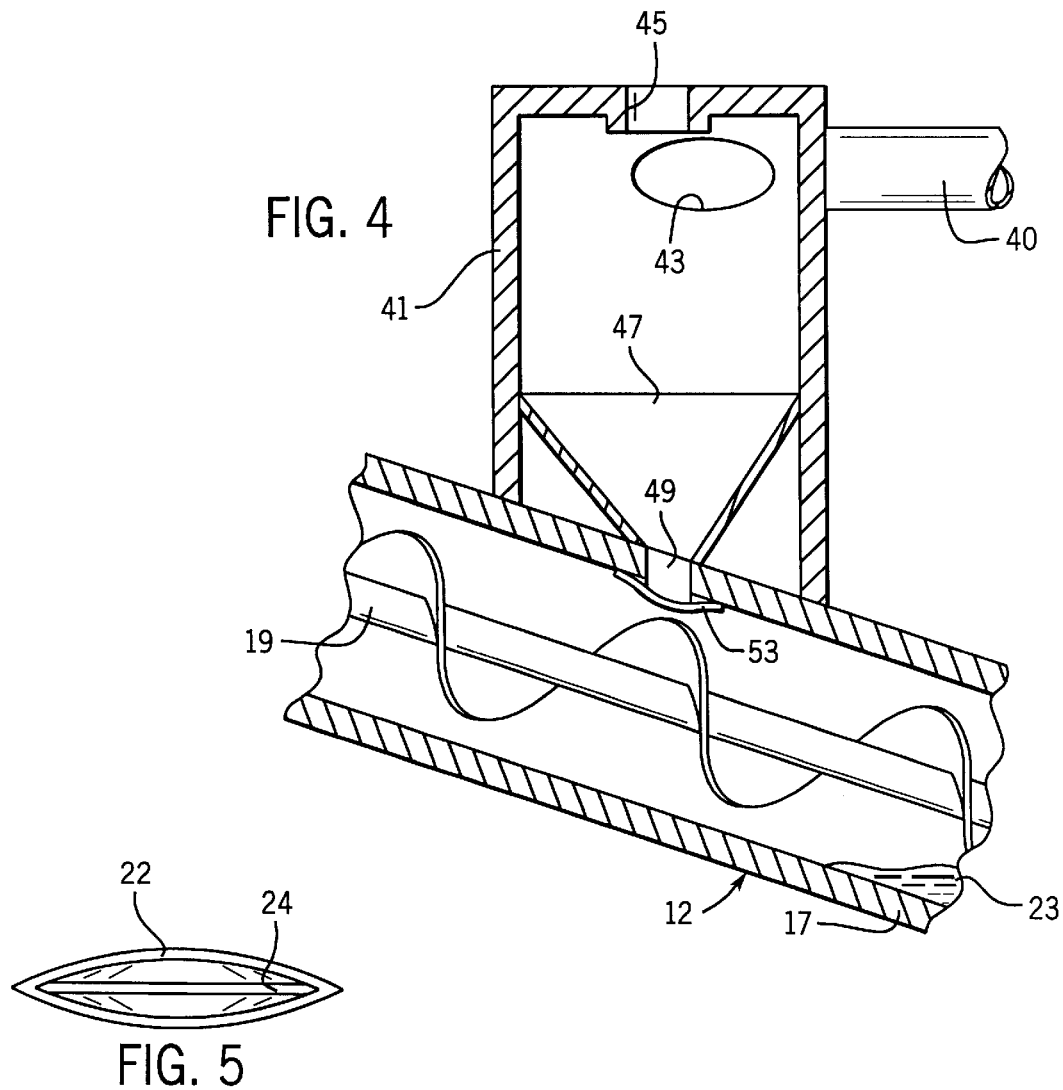
FIG. 4
FIG. 5
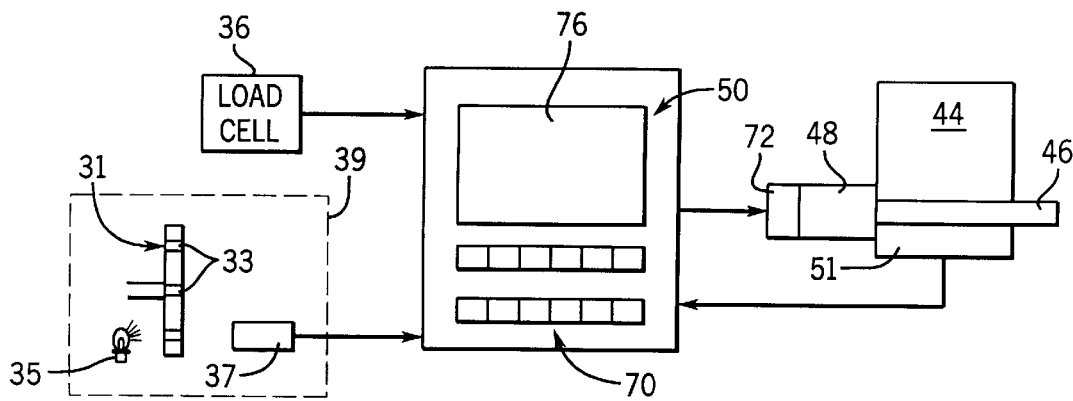
FIG. 6

APPARATUS FOR MEASURING RATE OF CHEESE PRODUCTION

This application claims the benefit of U.S. Provisional Application No. 60/064,824, filed Nov. 7, 1997.

BACKGROUND OF THE INVENTION

The present invention relates to cheese processing equipment; and more particularly to equipment which adds salt to the cheese product.

Various types of cheese, such as mozzarella, have salt added to them during processing. This is typically done after the cheese has been molded or extruded into the desired shape. When extruded, the cheese first is cut into a properly sized portions. The formed cheese then drops into a brine solution in which it soaks for hours until the desired amount of salt has been absorbed. This process not only is time consuming, but requires a significant amount of floor space in the factory for the relatively large brine tanks that contain many hours (normally between 6 and 24 hours) production of cheese.

To avoid the long brining process, salt sometimes is added to the curd. This pre-salting results in chlorinated waste products, the disposal of which is an environmental problem. Ideally, the salt should be added after the cooking step and before the cheese is molded. Therefore, it is desirable to provide an alternative method of introducing salt into the cheese during processing in a way which is both faster and requires less factory area.

However, when adding salt to the curd, the amount of salt must be controlled accurately as variation in the proportions of salt and cheese affects the flavor of the end product. Therefore, the amount of cheese to which the salt is being added must be precisely measured and the amount of salt must be controlled accordingly. Heretofore, equipment was not available to dynamically weigh the cheese as it flowed continuously through the processing equipment.

SUMMARY OF THE INVENTION

A general object of the present invention is to provide a technique for dynamically determining the amount of cheese flowing through processing equipment.

Another object is to provide an apparatus for weighing the cheese flowing through processing equipment.

A further object of the present invention is to provide a for measuring a linear amount of cheese being produced.

Yet another object is to dynamically determine the rate at which the cheese is being produced by the processing equipment.

These and other objectives are satisfied by an apparatus that includes a platform across which the cheese travels. A first sensor is attached to the platform for measuring weight of the cheese on the platform, and a second sensor measures a length dimension of the cheese traveling across the platform. A processor is connected to the first and second sensors and responds to the weight and the length dimension of the cheese by deriving a measurement of the rate at which cheese is being produced.

Another aspect of the present invention is to regulate the application of salt to the cheese based on the measurement of the rate at which cheese is being produced. For this aspect of the present invention, a dispenser is provided for applying salt to the cheese at an application rate which varies in response to a control signal. The controller produces the control signal in response to the cheese production rate.

BRIEF DESCRIPTION OF THE DRAWINGS

FIG. 4 is a cross-sectional view of the portion of the cheese processing apparatus at which the salt is introduced into the cheese;

FIG. 5 is a front view of a nozzle in FIG. 1; and

FIG. 6 is a schematic diagram of a control circuit for the salt metering device.

DETAILED DESCRIPTION OF THE INVENTION

Figure 1:
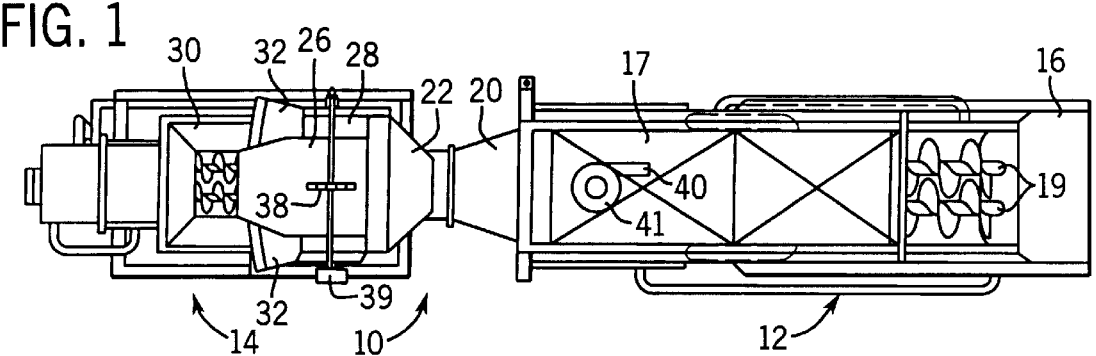
FIG. 1 is a top view of a cheese processing apparatus according to the present invention.
Figure 2:
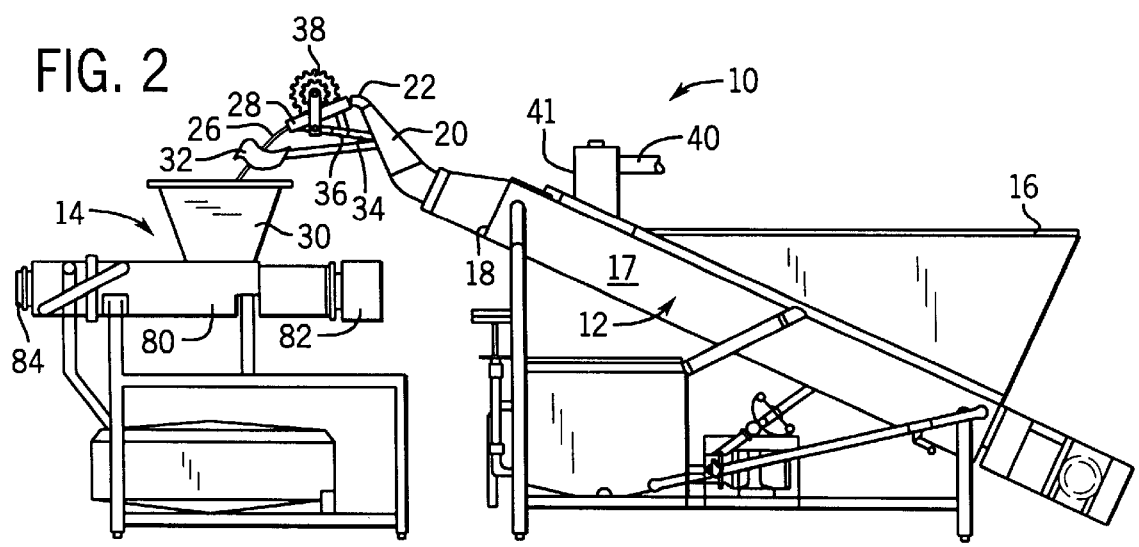
FIG. 2 is a side view of the cheese processing apparatus.

With initial reference to FIGS. 1 and 2, a cheese processing machine 10 comprises a cooker 12 and a cheese forming machine, such as extruder 14 or a conventional molder. The cooker 12 is of a standard commercial design except that its heated cooking chamber 17 is inclined from an inlet hopper 16 upward to an outlet end 18. A pair of augers 19 within the cooking chamber 17 force the cooked cheese into an intermediate tube 20, that is six inches in diameter, for example. The cooked cheese in a fluid state travels up the intermediate tube 20 to a spout 22 attached to the remote end of the intermediate tube.

Figure 3:
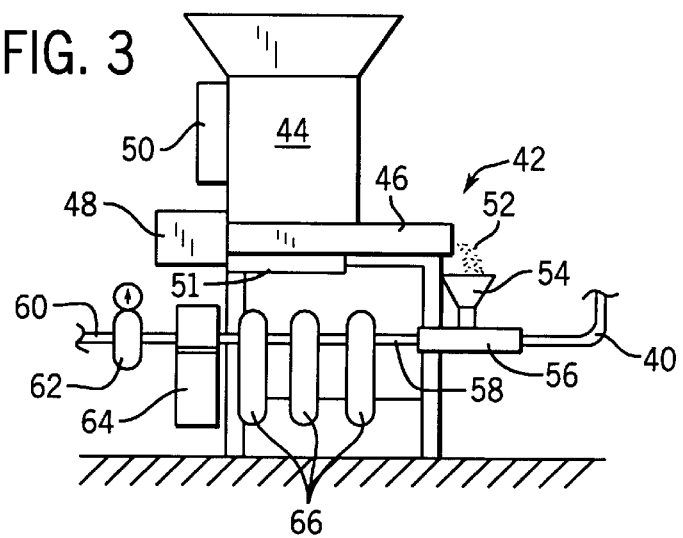
FIG. 3 is a side view of a salt metering device.

Salt is added as the cheese moves through intermediate tube 20. The salt is supplied from a salt dispenser 42 shown in FIG. 3, which comprises a salt hopper 44 mounted above an auger unit 46. The auger unit 46 is driven by a variable speed motor 48 the speed of which is governed by a system controller, which may be dedicated to controlling application of salt or which may control a variety of functions on the cheese processing machine 10. Salt 52 exits the auger unit 46 at a rate determined by the speed of the motor 48. A loss-in-weight system 51 constantly monitors how much salt has been removed from the hopper 44. The speed of auger motor 48 is controlled in response to the loss-in-weight system 51 to ensure that desired flow of salt is being achieved, as will be described. The exiting salt 52 drops into a funnel 54 which supplies the salt to a venturi nozzle 56. Pressurized air flows from inlet tube 58 through the venturi nozzle 56 blowing the salt into the supply tube 40.

The pressurized air is supplied by input line 60 from a conventional air compressor (not shown) to a pressure regulator 62 which maintains the pressure at a predetermined level, 40 PSI for example. The compressed air then flows to a standard water trap 64 which collects any moisture within the air before it reaches a multiple stage filtration system comprising several food-grade air filters 66 connected in series. The output of the air filtration system is connected to the input of the venturi nozzle 56. Thus, the air entering the venturi nozzle provides a partial vacuum at the bottom of the salt collection funnel 54 and accelerates the salt through into the supply tube 40.

The other end of the salt supply tube 40 is connected to an a cyclonic separator 41 on the cooker 12 as seen in FIG. 4. The air and salt mixture from supply tube 40 enters the separator 41 through inlet 43 and the curved walls of the separator create a cyclonic air flow pattern which causes the salt to drop downward and the air to be exhausted through an opening 45 in the separator top. An interior funnel 47 directs the separated salt through a slot 49 into the cooking chamber 17. An auger 19 in the cooker 12 pushes the cooking cheese through the chamber 17 upward out of the water 23, past the cyclonic separator 41 and toward the spout 22. The contents of the cooker 12 in the vicinity of the cyclonic separator 41 are a combination of cheese curds and water at approximately 135° F. The salt enters the cooker through the slot 49 by gravity and movement of the augers 19 combines the salt with the cheese. A curved deflector plate 53 within the chamber 17 prevents cheese from escaping through the slot 49.

Referring again to FIGS. 1 and 2, salted cheese travels upward through the intermediate tube 20 to the spout 22. The spout 22 has a round inlet end connected to the intermediate tube 20 and then tapers into a two inch by eighteen inch outlet opening 24, for example (see FIG. 5). The shape of the spout 22 forms the cheese into a long narrow ribbon 26 conforming to the dimensions of outlet opening 24.

This ribbon 26 of cheese slides out of the spout 22 onto an inclined platform 28 which slopes downward toward the input hopper 30 of the extruder 14. The cheese ribbon 26 sliding off the inclined platform 28 strikes a pair of deflector plates 32 that are tilted inward to guide the cheese ribbon as it drops into the top opening of the hopper 30.

In order to control the application of the proper of salt to the cheese, it is important to know the quantity of cheese flowing through the cooker 12. The cheese processing machine 10 accomplishes this by measuring the linear flow rate and the weight of the cheese ribbon 26 as it travels down the inclined platform 28. The inclined platform 28 is mounted on a support 34 with a sensor 36, such as one or more load cells, which provides an electrical signal indicating the weight of the cheese. By knowing the tare weight of the platform, the weight of the cheese can be derived from the sensor signal.

The length of the cheese ribbon 26 that travels down the inclined platform 28 is detected by a free wheeling sprocket 38 which rides on the cheese ribbon and rotates due to the linear movement of the cheese. The free wheeling sprocket 38 is coupled by a shaft to a motion sensor 39. For example as shown in FIG. 6, the motion sensor 39 has a detector wheel 31 with a plurality of apertures 33 arranged in a circle, a light source 35 on one side of the wheel and a light detector 37 on the opposite side. As the wheel turns, the holes and opaque sections between the hole alternately transmit and block light from reaching the detector 37. For example the wheel may be a sprocket with a series of teeth projecting radially at regular intervals from the outer circumference. The motion sensor 39 is designed so that a pulse of light will appear at the light detector 37 whenever the cheese ribbon 26 has traveled a given distance down the inclined platform 28. The light detector 37 responds to receiving a light pulse by producing an electrical signal pulse.

With reference to FIG. 6, a processor in the form of a system controller 50 receives the signals from the motion sensor 39 and the weight sensor 36. The system controller 50 contains a microcomputer which executes a control program stored in a memory to control the application of salt to the cheese. The system controller 50 also includes input/output circuits for interfacing to the sensors and actuators on the cheese processing machine 10. A system controllers for this purpose are well known for operating manufacturing equipment, such as programmable logic controllers, for example.

The signal from the weight sensor 36 is applied to an analog input of the system controller 50 where that signal is converted into a digital value. From the input digital value, the system controller 50 subtracts a value corresponding to the tare weight of the inclined platform 28 to derive the weight (in pounds for example) of the cheese on the inclined platform. The system controller 50 similarly receives the pulses from the motion sensor 39 and counts the number of pulses occurring in a given period of time (e.g. one minute).

From the weight and the number of pulses, the system controller 50 calculates the production rate of cheese in pounds per hour. To accomplish this, the system controller utilizes the expression:

$$\text{Rate} = \left(\frac{\text{Weight}}{X}\right)(\text{pulses/min.})(\text{inches/pulse})(60\text{min./hour})$$

where X is the length of the platform 28 and Rate is the cheese production rate. For a 12 inch long platform (X=12 inches) and a motion sensor 39 that emits a pulse for every two inches of cheese travel, the expression can be simplified to:

$$\text{Rate} = 10(\text{Weight})(\text{pulses/minute}).$$

Although pounds, inches and minutes are being used in the present description, other units of measurement may be employed.

The system controller 50 also receives a signal from a input device, such as a keyboard 70, by which the operator specifies the particular salt content for the finished cheese. The amount of salt is specified as a percentage of the cheese weight which the system controller 50 converts into a flow rate of salt through the supply tube 40 and thus from the salt dispenser 42.

By knowing the rate at which the cheese is flowing through the cooker 12 and the desired salt content for the cheese, the system controller 50 is able to calculate a speed at which the dispenser motor 48 should drive the auger unit 46 to apply salt at the required rate to the cooker. Thus the system controller 50 issues a command signal to a conventional variable speed motor controller 72 which responds by driving the salt auger motor 48 at a speed which supplies the proper amount of salt into the air stream in venturi nozzle 56.

A feedback loop also ensures that salt at the desired rate is being applied to the cheese. In this regard, the loss-in-weight system 51 produces a signal which indicates the amount of salt that has been dispensed during a given period of time, during each minute for example. The system controller 50 receives that signal and determines whether the actual amount of salt being dispensed equals the amount required to produce cheese with the desired salt content. The command signal sent to the variable speed motor controller 72 is varied so that the salt auger motor 48 operates at a speed which results in salt being introduced into the cheese at the desired rate.

A display 76 connected to the system controller 50 provides the operator with an indication of the amount of cheese being produced per hour, the salt content of the cheese as set via keyboard 70 and the hourly salt consumption. This information is useful to the operator of the cheese processing equipment.

The extruder 14 is of a conventional design and comprises an auger assembly 80 driven by a motor 82 which forces the cheese from the hopper 30 through an extrusion head 84 in a conventional manner. The auger 80 further combines the salt into the cheese. Alternatively, the extruder 14 can be replaced by a conventional cheese molding machine.

I claim:

1. An apparatus for a cheese processing machine, said apparatus comprising:

a member across which the cheese travels;

a first sensor attached to the member and for measuring weight of the cheese on the member;

a second sensor for measuring linear motion of the cheese traveling across the member; and a processor connected to the first and second sensors and which derives a measurement of a cheese production rate which measurement is in response to the weight and the linear motion of the cheese.

2. The apparatus as recited in claim 1 wherein the second sensor comprises a wheel which rides on the cheese traveling across the member, and a mechanism that senses rotational movement of the wheel.

3. The apparatus as recited in claim 2 wherein the mechanism comprises a detector wheel with light transmissive sections and opaque sections interleaved in a circle, a light source on one side of the detector wheel, and a light detector on an opposite side of the wheel.

4. The apparatus as recited in claim 1 wherein the processor derives the measurement of the cheese production rate by multiplying the weight by a length dimension derived from the linear motion of the cheese.

5. The apparatus as recited in claim 1 further comprising a dispenser for applying salt to the cheese at a rate which varies in response to a control signal produced by the processor in response to the measurement of the cheese production rate.

\* \* \* \* \*